United States Patent [19]

Duncan

[11] Patent Number: 4,868,360
[45] Date of Patent: Sep. 19, 1989

[54] MICROWAVEABLE/STOVETOP COOKING UTENSIL

[75] Inventor: John K. Duncan, Solon, Ohio

[73] Assignee: Corning Glass Works, Corning, N.Y.

[21] Appl. No.: 114,994

[22] Filed: Oct. 30, 1987

[51] Int. Cl.[4] .............................................. H05B 6/80
[52] U.S. Cl. ...................... 219/10.55 E; 219/10.55 F;
99/DIG. 14; 426/243
[58] Field of Search ................. 219/10.55 E, 10.55 F,
219/10.55 R; 99/DIG. 14, 451; 220/DIG. 27,
366, 94; 126/390; D7/360, 361; 426/243

[56] References Cited

U.S. PATENT DOCUMENTS

| | | | |
|---|---|---|---|
| 4,167,606 | 9/1979 | Ulam | 220/458 |
| 4,491,235 | 1/1985 | Fournier | 220/94 |
| 4,689,458 | 8/1987 | Levendusky | 219/10.55 E |

Primary Examiner—A. D. Pellinen
Assistant Examiner—Leon K. Fuller
Attorney, Agent, or Firm—Pennie & Edmonds

[57] ABSTRACT

An improved metallic cooking utensil suitable for use both in stovetop cooking such as frying and in a microwave oven is disclosed. The utensil features a bowl member formed of a single piece of stainless steel having a relatively square cut-off edge, that is, without a rolled-over edge or other complex edge detail. The upper portion of the disk member forms a circumferential flange which is extended at least two points to receive handles. The handles are formed of a microwave-transparent polymer material, and are affixed to the extended portions of the flange by rivets extending through square holes formed in the flange extensions. The bowl defines a relatively broad radius between its bottom portion and the upper flange, and may have a heat conductive element plated onto or affixed to its bottom for improvement of its heat conducting characteristics.

11 Claims, 4 Drawing Sheets

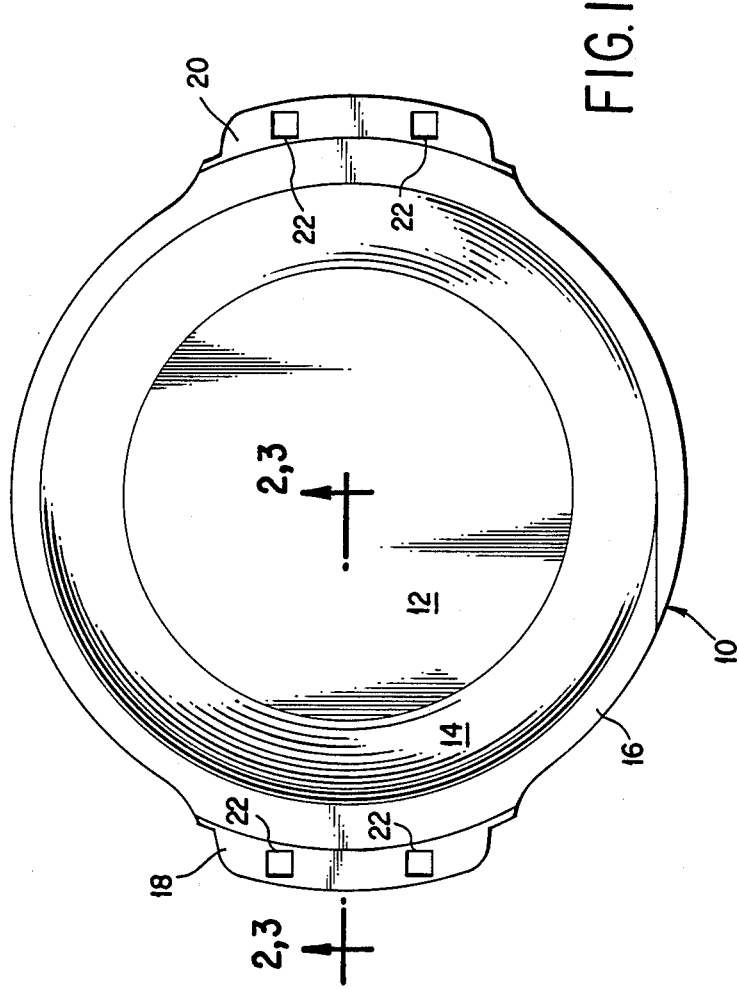

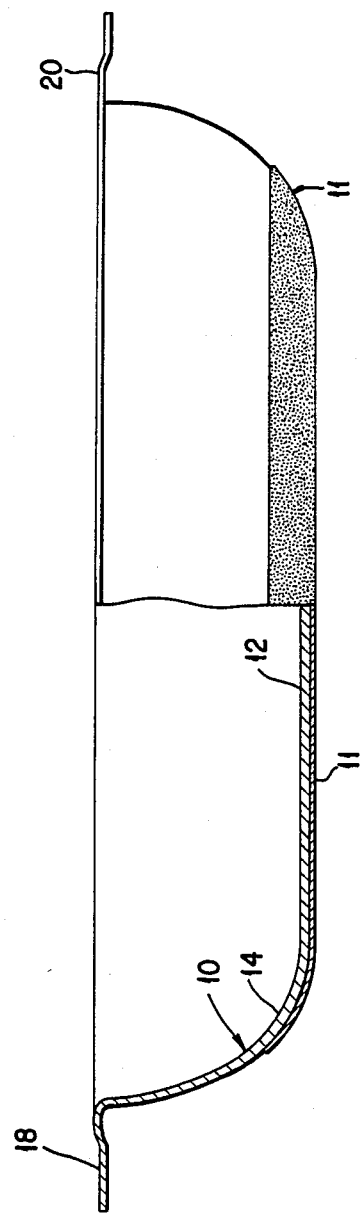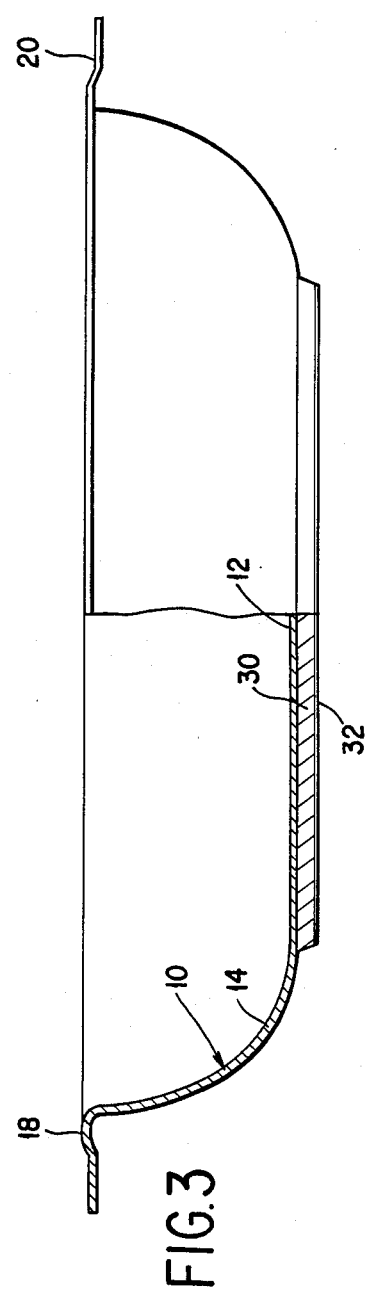

MICROWAVEABLE/STOVETOP COOKING UTENSIL

FIELD OF THE INVENTION

This invention relates to cooking utensils. More particularly, this invention relates to an improved cooking utensil which is useful both in stovetop cooking, that is, on a conventional electric or gas range, and in microwave cooking.

BACKGROUND OF THE INVENTION

In recent years, microwave cooking has become extremely common. This is primarily because microwave cooking is an extremely rapid way of transferring heat to food, such that the food is cooked more quickly than by other methods. Essentially, microwave radiation excites water molecules in the food, heating it uniformly throughout.

However, microwave cooking is not without its drawbacks. Chief among these is the fact that precisely because the food is heated relatively uniformly throughout, rather than from the surface inwardly, as in the case of pan frying, the outside of the food does not tend to brown.

It would accordingly be desirable to provide a way in which the time-efficiency of microwave cooking could be combined with the aesthetic and flavor advantages of pan frying or other browning processes.

It would of course be possible to first pan fry a piece of food and then finish cooking it in a microwave oven. To date, this two-stage process has been rendered inconvenient by the fact that separate utensils have been employed for pan frying and for microwave cooking. Two utensils then have to be washed, etc., which is undesirable. Furthermore, the heat content of the utensil used in the frying process is lost if the food is subsequently transferred to another utensil for finishing in a microwave oven. This wastes both energy and time.

More specifically, browning a piece of meat on the stovetop has typically been done using a metallic frying pan. However, it is well known that as a rule metallic cookware is not suitable for use in the microwave oven. This is because the microwave radiation sets up electric fields in the oven, which tends to cause arcing between metallic elements which are spaced relatively closely to one another. This arcing occurs in a way which cannot be reliably predicted by the typical home chef. Accordingly, the industry practice has been to urge cooks against placing any metallic items in microwave ovens.

A need thus exists in the art for an improved cooking utensil which is suitable for pan frying and for use in a microwave oven, such that a food item can be first browned and then cooked through in a microwave oven, both in the same utensil, thus combining the advantages of eye appeal and taste from the pan frying process with the advantages of speed and energy efficiency in the microwave process.

SUMMARY OF THE INVENTION

The above needs of the art are satisfied by the present invention which comprises a cooking utensil which is suitable for use on a stovetop or other direct heat source and in a microwave oven. The utensil of the invention comprises a metallic bowl member having a plain edge. The edge of the bowl of the utensil is thus prevented from arcing to the body of the bowl, as tends to occur with the typical rolled edges of a bowl conventionally formed of sheet material. The handles of the utensil of the invention are formed of a polymeric material which is transparent to microwave radiation and which contains no moisture.

In a particularly preferred embodiment the holes in flanges of the bowl through which rivets affixing the handles to the utensil pass are square. The bowl is formed with a relatively deep side wall, of widely radiused contour which tends to focus the microwave energy into the center of the utensil. The utensil may have a copper plated bottom or incorporate an aluminum slab, for effective heat conduction over the entire bottom surface of the utensil.

BRIEF DESCRIPTION OF THE DRAWINGS

The invention will be better understood if reference is made to the accompanying drawings, in which:

FIG. 1 shows a plan view of the bowl member of the utensil according to the invention;

FIG. 2 shows a cross-sectional view of the bowl member of the utensil according to the invention in a first embodiment thereof;

FIG. 3 shows a cross-sectional view of the bowl member according to the invention in a second embodiment thereof;

DESCRIPTION OF THE PREFERRED EMBODIMENT

Figure 4:
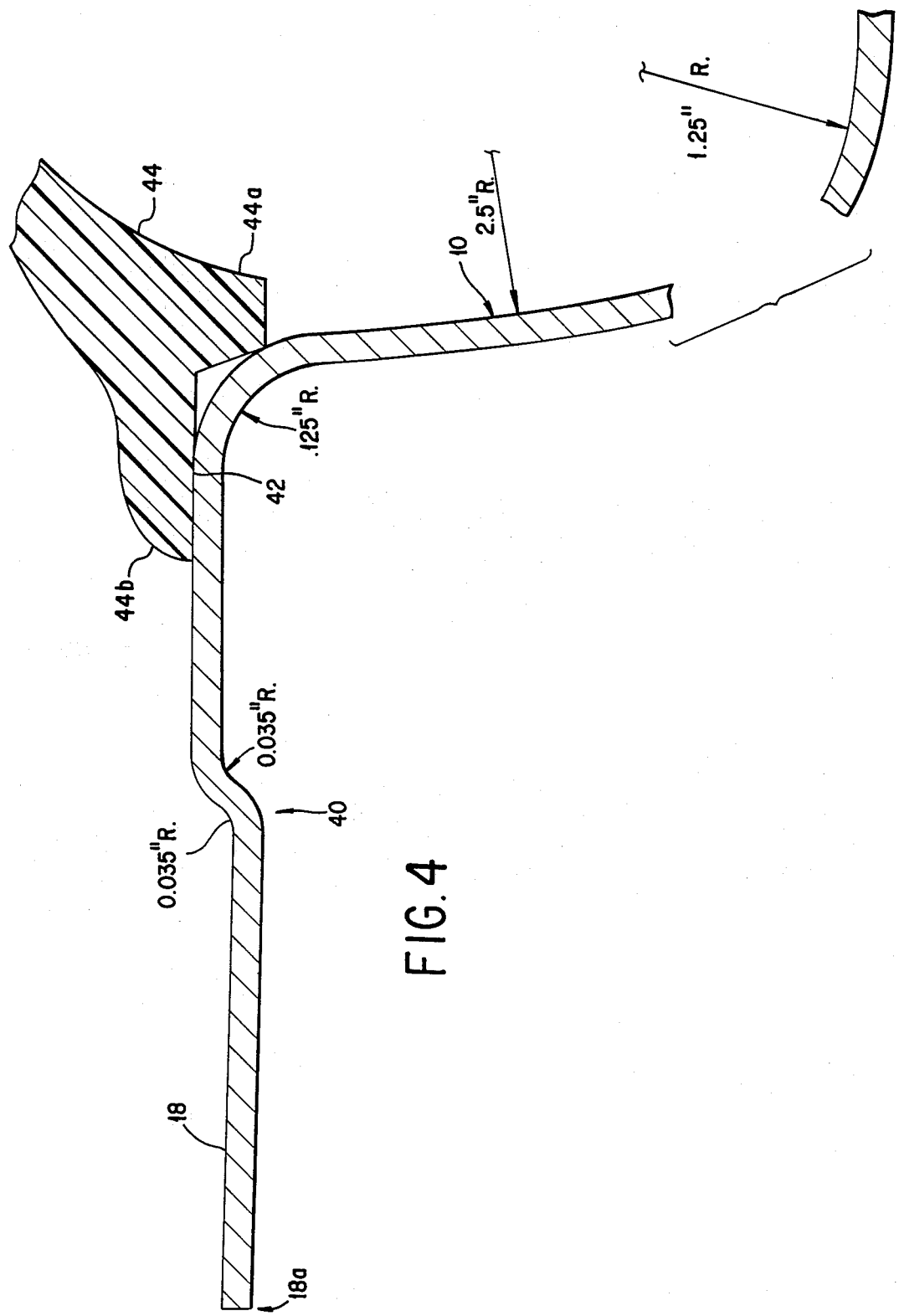
FIG. 4 shows a detailed cross sectional view of the edge flange and wall of the bowl member of the utensil according to the invention.

As discussed above, metallic utensils suitable for cooking on gas and electric ranges and stovetops have typically not been used in microwave ovens, because of the possibility of arcing between metallic elements of the cookware itself or between the cookware and the metallic interior surface of the oven. This arcing is particularly likely to occur between metallic members which approach relatively closely to one another, in the manner in which the typical rolled edges of utensils formed from a flat sheet of metal approach the body of the utensil. According to the present invention, such rolled edges or other closely spaced metallic members are eliminated.

FIG. 1 shows a plan view of a bowl of a utensil according the invention. The bowl 10 is formed of a single sheet of metal, typically 18-8 stainless steel 0.035" thick, and comprises a flat bottom portion 12, a widely radiused wall portion 14 detailed in connection with FIG. 4, and a flange 16 which terminates at a squarely cut-off edge, also detailed in connection with FIG. 4. The flange 16 includes at least two diametrically opposed extensions 18 and 20, which form mounting locations for handles detailed in connection with FIGS. 5–7. As can be seen in FIG. 1, holes 22 are formed in the extensions 18, 20 through which rivets affixing the handles extend. As indicated these holes are square; in a preferred embodiment they may be 0.375" square. Experiments performed on behalf of the assignee of the present application have established that such square holes appear to be more effective in eliminating arcing than comparable round holes. In a preferred embodiment of the invention, in which the overall diameter of the bowl 10 is approximately 10" in diameter, these square holes 22 may be spaced 2.125" on centers. This dimension also appears to reduce arcing as opposed to more closely spaced holes.

The left portions of FIGS. 2 and 3 show cross-sectional views along the line 2,3—2,3 in FIG. 1 while their right portions show corresponding elevations. FIG. 2 shows a first embodiment of the invention in which the lower portion of the bowl 10 is plated with a layer 11 of copper, while FIG. 3 shows a second embodiment in which the same bowl 10 has attached thereto an aluminum disc 30, which in turn has its lower surface covered by a disc 32 of stainless steel 32. As shown in FIGS. 2 and 3, the wall portions 14 of the bowl member 10 are very broadly radiused to define a deep bowl, such that the walls 14 meet the flanged portion 16 at nearly a 90° angle; this shape, which is detailed below in connection with FIG. 4, helps focus the microwave energy from the walls of the utensil into the center.

As indicated on the right side of FIG. 2 the lower portion, typically the lowest 0.43" of the bowl 10, in the first embodiment of the invention may be plated with a layer 11 of copper to a thickness of 0.032–0.035". This sheathing copper layer 11 provides an effective heat distribution surface, such that the entire bottom surface of the utensil can be heated uniformly on a stovetop.

In the second embodiment of the invention, shown in FIG. 3, the same heat conductive function is performed by the aluminum disc 30. In this embodiment, disc 30 may be 5 mm (approximately 0.200") thick. Disc 30 is then covered by a further disc of stainless steel, typically of 0.035" thick 18-8 stainless steel, that is, the same material used for the dish member 10. This assembly may be made by brazing. The aluminum/stainless steel disc is thus in intimate heat conductive relation with the metal of the bowl 10. As recognized by those skilled in the art, the aluminum/stainless steel disc construction avoids the tarnishing of copper plating, while providing generally similar heat conductive characteristics. The outer stainless steel disc prevents discoloring of countertops and the like which can occur if contacted by aluminum.

FIG. 4 shows a detailed cross-sectional view of the flange extension 18 of the bowl 10 where the handle is to be attached, and a portion of the bowl wall. As indicated, the flange extension 18 terminates in a square end 18a, as opposed to the usual rolled edges of utensils formed of sheet metal. End 18a is not radiused or otherwise provided with a rounded edge, although any burrs or sharp edges which might tend to cut the user are removed in a buffing operation during manufacture of the utensil. The flange portion 18 as shown is formed to comprise an offset indicated generally at 40, principally to achieve an esthetically pleasing design.

The same square edge shape 18a shown is provided at the edge of the remaining portion of the flange 16, as indicated at 42. Again this edge is square and is not rolled or otherwise formed to provide a small gap between adjacent metallic members which might cause arcing in a microwave oven.

As shown in FIG. 4, the radius of the upper portion of the wall of the bowl is substantially 2.50"; and is gradually varied to approximately 1.25" at the lower portion of the wall 14, in an embodiment wherein the bowl is nominally 10" in diameter and approximately 2.25" deep. Applicants have found that these proportions help to focus the microwave energy into the center of the dish, where the food to be cooked is desirably concentrated. The wall 14 meets the flange 16 at a radius of approximately 0.125", and the offset 40 comprises two bends of approximately 0.035" radius, all as indicated.

As indicated in partial sectional view in FIG. 4, the utensil of the invention will typically be supplied with a tempered glass cover member 44 having a downwardly depending flange 44a and an outwardly extending flange 44b. As indicated, the outwardly extending flange 44b extends beyond the edge of the flange 16 of the utensil in the regions where the handles are not located, as shown at 42. Accordingly the glass cover 44 can be used to space the dish member 10 of the utensil of the invention from the inside wall surface of a microwave oven, thus preventing arcing therebetween. However, use of the cover 44 is not considered essential to use of the utensil according to the invention in a microwave oven.

Figure 7:
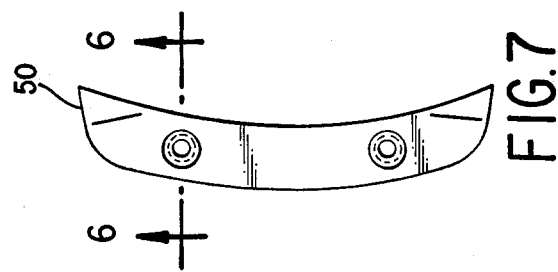
FIG. 6 shows a cross-sectional view taken along the lines 6—6 of FIGS. 5 and 7 and FIG. 7 shows a bottom view of the bottom handle member of the utensil according to the invention.
Figure 6:
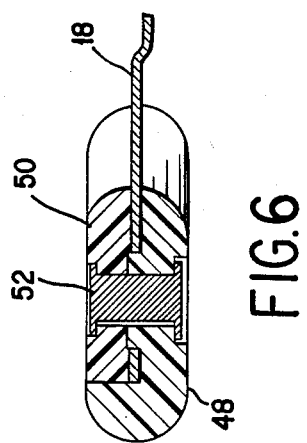
Figure 5:
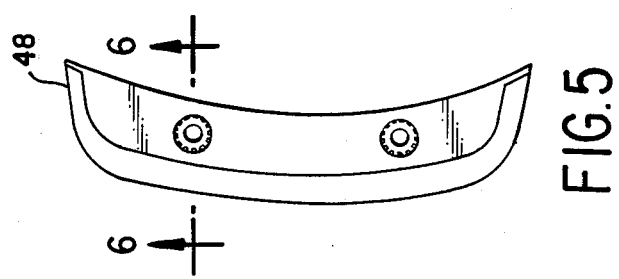
FIG. 5 shows a bottom view of the top member of the handle of the utensil of the invention.

FIG. 5 shows a bottom view of an upper element 48 of one of the handles of the utensil according to the invention, while FIG. 7 shows a comparable bottom view of the lower element 50 of one of the handles of the utensil, and FIG. 6 shows a combined cross-sectional view of the two members of the handle elements 48 and 50 as assembled with the flange element 18 sandwiched therebetween. Rivets 52, which may be formed of stainless steel, hold the assembly together. The shapes of elements 48 and 50 may be chosen to fit the user's hands comfortably, for esthetic appeal, and the like. However, the material of the handle members 48 and 50 is to be chosen carefully so as not to be damaged or dangerous when exposed to microwave radiation. More specifically, a Bakelite (TM) material has commonly been used for utensil handles. However, Bakelite absorbs microwaves and can explode when exposed to microwave energy, and therefore is not usable for microwave utensils. According to the present invention, a polymer product known as SILRYN (TM) which is sold by Polymer Engineering of Wolcott, Indiana, which is microwave transparent and has a suitably low coefficient of heat conductivity is used to form the handle members.

It will be appreciated that according to the invention a microwaveable/stovetop cooking utensil is provided, which comprises a bowl member formed of a single sheet of stainless steel material having a plain, square circumferential edge and handles which are formed of a microwave-transparent material having a low coefficient of heat conductivity. The bowl member may be plated or assembled together with a highly heat conductive member on its lower surface. The bowl member is formed with a very broad radius between its bottom and wall members, to focus microwave energy toward its center, and may be supplied together with a cover formed of glass or another electrically insulative material, sized to space the metallic dish member away from the walls of a microwave oven within which it is used.

While several preferred embodiments of the invention have been described in detail, these are not to be considered as limitations on the invention but only as exemplary thereof. Accordingly the invention is to be limited only by the following claims.

We claim:
1. A microwaveable/stovetop cooking utensil, comprising:

a bowl member, formed of a single sheet of metal, said bowl member having a flat bottom surface portion, a peripheral wall portion, and a broad radius transition portion joining said bottom surface portion to said peripheral wall portion which transition portion focuses microwave energy toward the center of the dish and further comprising a square-edged flange at the upper extremity of said wall portion, said flange having at least two extensions for receiving handle members; and handle members affixed to said at least two extensions of said flange, said handle members being formed of a material which is transparent to microwave energy.

2. The utensil of claim 1, wherein the lower portion of said bowl is plated with a material of higher heat conductivity than the material of said bowl.

3. The utensil of claim 2 wherein the material of said bowl is stainless steel and the plated material is copper.

4. The utensil of claim 1 in combination with a heat conductive element affixed to the lower portion of said bowl member in intimate heat conductive relationship therewith, said heat conductive element being formed of material of higher heat conductivity than the material of said bowl.

5. The utensil of claim 4 wherein said heat conductive member is formed of aluminum, and the material of said bowl is stainless steel.

6. The utensil of claim 5 wherein said aluminum member is further coated by a layer of stainless steel.

7. The utensil of claim 1 wherein said handles are affixed to at least two extensions of said flange by a plurality of rivets.

8. The utensil of claim 7 wherein said rivets pass through square holes in said extensions of said flange.

9. The utensil of claim 8 wherein said square holes are spaced at least about 2" from one another on each of said extensions of said flanges.

10. The utensil of claim 1 wherein the radius of said transition portion varies between about 1.25" where said transition portion joins said flat bottom surface portion and about 2.50" where said transition portion joins said wall portion.

11. The utensil of claim 10 wherein said bowl is formed to have a radius of about 0.125" where said wall portion meets said flange portion.

* * * * *